ELECTRONIC DIGITAL COMPUTING MACHINES
Filed March 23, 1954
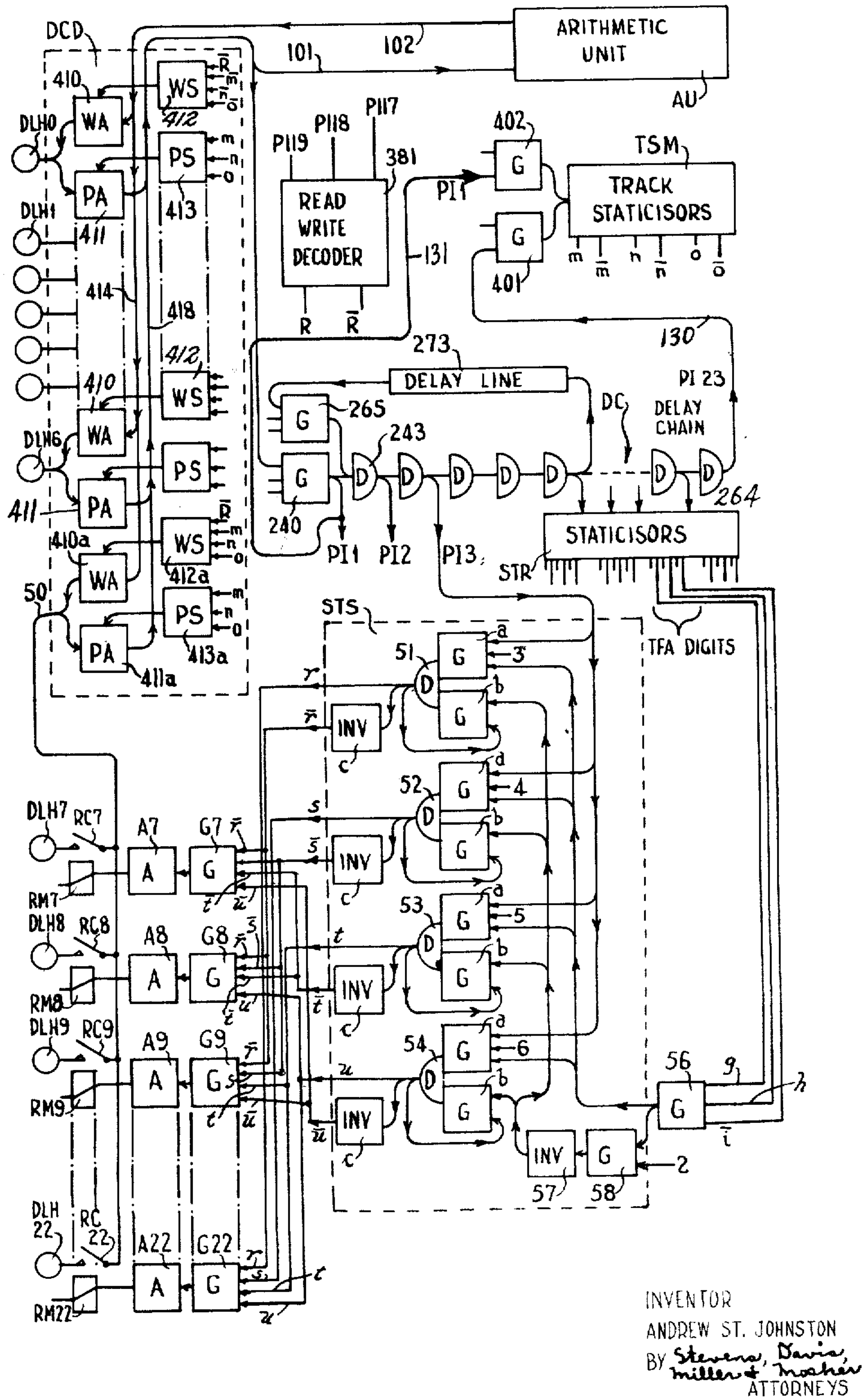
INVENTOR
ANDREW ST. JOHNSTON
BY Stevens, Davis, Miller & Mosher
ATTORNEYS

United States Patent Office 2,952,837

Patented Sept. 13, 1960

2,952,837

ELECTRONIC DIGITAL COMPUTING MACHINES

Andrew St. Johnston, Buntingford, England, assignor, by mesne assignments, to International Business Machines Corporation, New York, N.Y., a corporation of New York

Filed Mar. 23, 1954, Ser. No. 418,105

Claims priority, application Great Britain Mar. 24, 1953

12 Claims. (Cl. 340—172.5)

This invention relates to electronic digital computing machines and is more particularly, although by no means exclusively, adapted to machines employing, as a data storage device, a multiple track magnetic recording drum or disc having an individual recording/reproducing head associated one with each of such tracks, access to any one of which heads is obtained by means of electronic switching means controlled by predetermined (track selection) digits in an instruction word used within the control system of such machine. A machine of this type, to which the present invention will later be described as associated, is referred to in detail in my copending U.S. patent application Ser. No. 418,104 and copending U.S. patent application of Charles Edward Owen for Electronic Digital Computing Machines, Ser. No. 418,129, both filed of even date herewith.

One object of the present invention is to provide for extension of the storage capacity of the data store without having to extend the number of track selecting digits in the instruction word used in the control system of the machine. As will readily be appreciated by those skilled in the art, any extension of the number of digits allocated to a particular purpose, e.g. track selection, in an instruction word, almost always means a corresponding curtailment of the facilities afforded by other control portions of the instruction word in view of the fact that the number of digits available in such an instruction word is usually strictly limited.

In accordance with the broadest aspect of the invention, an electronic digital computing machine having a first plurality of sources of or destinations for data signals selectable under the control of a machine instruction is so arranged that at least one of such sources or destinations is a busbar associated with a further plurality of sources or destinations.

In a preferred embodiment of the invention the machine is so arranged that the connection of a chosen one of said further plurality of sources or destinations to said busbar or to a chosen busbar is effected under the control of a special machine instruction.

In order that the above and other features of the invention may be more readily understood one embodiment thereof will now be described with reference to the accompanying drawing which illustrates in block schematic form certain elements of the computing machine which is described in detail in the aforesaid copending applications together with, in more detailed block schematic form, the various additional elements and modifications necessary in accordance with the present invention.

In the drawing the various symbols and legends have the significance explained in the aforesaid copending applications while those parts which correspond with the elements of the machine described in such applications have been given similar reference characters to facilitate cross reference.

As explained in the aforesaid copending applications the machine is one operating in the serial mode with number and instruction words expressed as electric pulse signal trains with binary digit value "1" signalled by a positive-going pulse in any particular digit interval and binary digit value "0" signalled by the absence of such pulse in any particular digit period. The word-length of the machine is 32 digits with a two-digit gap between adjacent words making a 34-digit beat period with each digit period having a time duration of 3 microseconds.

The normal instruction words used in the machine have the various digits 1–32 thereof allocated to the following control purposes:

Digits 1–10—First address number (A1)
Digits 11–13—Control function (CF)
Digits 14–16—Transfer from accumulator (TFA)
Digits 17–19—Accumulator function (AF)
Digits 20–22—Transfer to accumulator (TTA)
Digits 23–32—Second address number (A2)

In each of the address selection groups, A1, A2 of such instruction digits, a first sub-group of seven digits (digits 1–7 and 23–29) serve to control the selection of a required word storage location out of the 128 separate storage locations in any one track around a magnetic recording drum or disc forming the data store of the machine while the second sub-group in each group (digits 8–10 and 30–32) control the selection of a required one of a total of 8 separate storage tracks on said disc or drum.

Referring now to the accompanying drawings, DLH0 . . . DLH6 indicate seven combined read/write heads, each associated with a different one of seven recording tracks around the magnetic disc or drum of the data store. Each head is connected to the output of a writing driver circuit 410 and to the input of a preamplifier 411. The input to each writing driver circuit 410 is connected to a common input line 414 fed through further ancillary apparatus (not shown) from the write input lead 102 of the store. The output from each preamplifier 411 is similarly connected to a common lead 418 which is connected through further ancillary apparatus, also not shown, to the output lead 101 from the store. Any one of the seven heads DLH0 . . . DLH6 can be selected for use by means of either of the subgroups of address selection digits (8–10 or 30–33) of an instruction word in the following manner. Each instruction word applied, during the usual operation cycle of the machine, to the delay chain DC of the control system of the machine through a gate 240 has such track selecting digits thereof staticised by a track staticisor TSM, the particular sub-group of addresses A1 or A2 acted upon being determined by which of the gates 401, 402 is opened. If gate 401 is opened the instruction word pulse train output PI23 passes from the last delay element 264 of the delay chain DC of separate delay elements 243 . . . 264 over lead 130 to such staticisors whereas if gate 402 is opened, the pulse train output PI1 passes from the gate 240 over lead 131 to such staticisors. According to the configuration of such instruction digits, so one or other of the alternative outputs $m$ or $\bar{m}$, $n$ or $\bar{n}$ and $o$ or $\bar{o}$ are rendered active.

Each writing driver circuit 410 is of the bias controlled type supplied with a control potential from an associated writing switch 412 in the form of a gate having four inputs, one of which is supplied with the $\bar{R}$ output from a read/write decoder trigger circuit or staticisor 381 which is set by certain function digits of the instruction word in the delay chain DC to make such $\bar{R}$ output active whenever it is required to write into the store, and the remaining three of which are connected to an individual combination of the three track staticisor outputs $m$, $\bar{m}$, $n$, $\bar{n}$, $o$, $\bar{o}$ so that only one writing switch is actuated at any particular setting of the track staticisors to release its associated writing driver circuit. Each preamplifier 411 is similarly bias controlled by a potential derived from an associated preamplifier switch 413 also in the form of a gate having three input connections connected respectively to the same combination of track staticisor outputs as its related writing switch 412. Thus, upon the actuation of said track staticisors TSM by any particular digit combination of the second sub-group of either address group A1, A2 of an instruction, so one of the seven heads DLH0 . . . DLH6 will be selected and this selected head will be arranged either for reading or writing according to the condition of the further R-waveform from the read/write decoder 381.

Except for the fact that a choice of only 7 heads instead of a maximum of 8 has been referred to, the above is a brief outline of the arrangements described in the aforesaid copending applications. As will be seen, the maximum number of track-selections available with the number of track selecting digits limited to three, is only 8. In order to extend the number of tracks available the arrangements according to the present invention comprise the connection of the eighth selection point, available through such decoder circuits DCD, by way of writing switch 412*a* and writing driver 410*a* or by way of preamplifier switch 413*a* and preamplifier 411*a*, to a busbar 50. This busbar 50 is connected to one contact of each of 16 relay-controlled switches RC7 . . . RC22 the opposite contact of each switch being connected to an associated one of a further group of write/read heads DLH7 . . . DLH22 each cooperating with further recording tracks around the disc or drum of the store. Thus, according to which relay-controlled switch is closed so the selection of what was previously track 8 through writing switch 412*a* or preamplifier switch 413*a* will now result in the selection of one of the further 16 tracks instead.

The arrangements for setting the relay magnets RM7 . . . RM22 to select the required one of the further 16 tracks are as follows. Each relay magnet is connected to an associated amplifier A7 . . . A22 whose controlling input is supplied from an interconnected gate G7 . . . G22. Each gate G7 . . . G22 has four controlling inputs.

The various gates G7 . . . G22 are conditioned selectively by the outputs from a further staticisor STS which comprises four trigger circuit arrangements 51, 52, 53, 54, conveniently of the kind utilising two gates and a unit delay as described in detail in the aforesaid copending applications. One input of the first gate *a* of each trigger circuit arrangement is supplied with an output comprising the instruction word pulse train at an appropriately delayed timing from the PI3 output of the delay chain DC. A second input of the same gate *a* is supplied, in the case of the first trigger circuit 51, with the 3-pulse waveform comprising a pulse in digit period 3 of each beat, in the case of the second trigger circuit 52, with the 4-pulse waveform, in the case of the third trigger circuit 53, with the 5-pulse waveform, and in the case of the fourth trigger circuit 54, with the 6-pulse waveform. A third input of each of the said first gates *a* of each trigger is supplied with the output of a gate 56 whose three inputs are controlled respectively by the *g*, *h* and $\bar{i}$ outputs of the TFA staticisor group of staticisor STR (shown in detail in Fig. 11C of the copending applications) and which are controlled so as to be active together by the digit combination 110 in the TFA group of digits in the instruction word. The second gate *b* of each trigger is connected so as to be supplied with the output of the associated delay to form the trigger arrangement while the second input of such second gate *b* of each trigger is connected in parallel to the output from an inverter 57 which itself is supplied with the output from a further gate 58 conditioned by the output from the gate 56 and the 2-pulse waveform. The direct output from the unit delay of the first trigger 51 constitutes the *r*-waveform and its inverse version after passage through the associated inverter *c*, the $\bar{r}$-waveform. The second trigger circuit 52 similarly provides the *s*- and $\bar{s}$-waveforms, the third trigger 53 the *t*- and $\bar{t}$-waveforms and the fourth trigger 54 the *u*- and $\bar{u}$-waveforms.

According to the particular setting condition of the four triggers 51 . . . 54 whose outputs are respectively applied, in different combinations, to each of the gates G7 . . . G22 so only one of said gates G7 . . . G22 will be open and the associated amplifiers A7 . . . A22 operated to cause energisation of the interconnected relay magnets RM7 . . . RM22. Thus if the STS staticisor outputs *r*, *s*, *t* and *u* are all active then the gate G22 will be opened and the amplifier A22 so energised that the relay magnet RM22 will close switch RC22 to connect the head DLH22 to the busbar 50. Alternatively if the setting condition of the triggers 51 . . . 54 is such that the $\bar{r}$, $\bar{s}$, $\bar{t}$ and $\bar{u}$-waveforms are all active then the gate G7 will be opened and the associated amplifier A7 energised to actuate relay magnet RM7 and thus close switch RC7 to connect head DLH7 to the busbar 50.

The timing of the output PI3 from the delay chain DC to the staticisor STS is such that the first digit of the first (word selecting) sub group of the first address A1 of an instruction word in the control system of the machine will coincide with the timing of the 3-pulse waveform applied to gate *a* of trigger 51 whereby any pulse present in the first A1 digit position will be injected into the trigger to set it on provided the gate 56 has been opened by the particular TFA function digit combination of *g*, *h* and $\bar{i}$ denoting a requirement to effect track selection. Similarly the second digit of such address A1 in the PI3 output coincides in timing with the 4-pulse waveform and either operates or does not operate the second trigger 52. Similarly, the third address digit A1 of the instruction controls the third trigger 53 and the fourth digit the fourth trigger 54.

The manner of operation of this arrangement is as follows. The normal operation of the machine is exactly as described in the aforesaid copending applications with, however, the proviso that selection of track 8 will give access, not to a head DLH7 but to one particular one of the group of heads DLH7 . . . DLH22 according to which of such heads has previously been connected to the busbar 50. Whenever access to a different one of the 16 additional tracks associated with heads DLH7 . . . DLH22 is required an instruction word is fed to the control system, containing the appropriate TFA digit combination *g h* $\bar{i}$ among its function digits and an appropriate configuration of the first four digits of its first address A1 to signal the required head DLH7 . . . DLH22 which is to be connected to the busbar 50. Upon the arrival of such instruction in the delay chain DC, gate 56 is opened. This first releases a 2-pulse through gate 58 and inverter 59 to effect the resetting off of any trigger 51, 52, 53 or 54 which was previously on. Thereafter, the aforesaid first four digits of the A1 address proceed to set up the four trigger circuits 51, 52, 53 and 54 of the staticisor STS in accordance with their configuration thereby opening a different one of the 16 gates G7 . . . G22 to control the associated amplifier and thereby to energise the related relay magnet and close the circuit connection between the head associated therewith and the busbar 50. Immediately the first instruction disappears from the delay chain DC and the staticisors STR, including the TFA group setting *g*, *h*, $\bar{i}$, gate 56 closes thereby inhibiting any change in the setting of the triggers 51 . . . 54 until after such TFA digit combination is again signalled. The newly selected head thus remains connected to the busbar 50 and will thereafter be obtained whenever "track 8" is selected.

After such relay switching operation, the normal function of the machine, as described in detail in the copending application, eventually finds coincidence between the particular address signal A1 thereof and the address location signals proceeding from the magnetic store and then proceeds to the next instruction signalled in the address A2 of such instruction word. The next instruction can, but need not, be one which calls for the use of the newly selected track among the 16 further tracks, which has been connected to busbar 50 during the previous instruction and if so its A1 address digits will comprise, in the track selecting sub-group (8–10) the three track selecting digits required to select "track 8," namely 111. Its word selecting digits (1–7) will, of course, specify the appropriate word position in such selected track.

Such state of affairs will continue indefinitely until a different track among the 16 supplementary tracks is required whereupon a fresh instruction containing the TFA digit combination 110, as described above will be utilised to alter the relay switching condition to connect a different one of the 16 supplementary heads DLH7 . . . DLH22 to the busbar 50.

It will be obvious that the special instruction necessary to alter the relay switching arrangements need not immediately precede the instruction which selects a word position in such new supplementary track; they can be separated if need be by further instructions. Alternatively, such special instruction can be made part of a normal machine instruction provided the TFA digits of the latter would otherwise be 000 and providing the first four A1 address digits have the same configuration as that required to sepecify the new supplementary head required. Under such conditions the change of "track 8" switching can proceed at the same time as the obeying of the normal instruction.

As the relays RM7 . . . RM22 require a finite time to operate it is desirable to arrange for an appreciable time period to elapse before operational use is made of the busbar 50 after any change of track switching. This can be achieved, as suggested above, by interposing further instructions related to other parts of the machine before proceeding to look for a particular word position in the new relay controlled subsidiary track. Alternatively, a sufficient time delay can be imposed by arranging that the instruction which contains the word position digits of the newly switched supplementary track is located on the drum or disc in such a word position such disc or drum has to make substantially one complete revolution before it is found after the completion of the track switching operation called for by the previous track selecting instruction.

Various modifications can obviously be made without departing from the invention. For instance, other forms of switching and other forms of trigger circuit or staticisor devices may be used.

I claim:

1. An electronic digital computing machine comprising a first plurality of sources of or destinations for data signals, at least one of said sources or destinations being a busbar, a control system for receiving an instruction word signal and for controlling the operation of said machine in accordance with the digit configuration of said signal, said control system including first address selecting means controllable by address selection digit signals of said instruction word signal for making selective connection between any one of said first plurality of sources or destinations and the remainder of the machine and function control means controlled by function control digit signals of said instruction word signal for determining the type of operation to be performed by the machine, a second plurality of sources of or destinations for data signals, selector switch means for establishing a connection between any chosen single one of said further plurality of sources or destinations and said busbar, second address selecting means also controllable by address selection digits of said instruction word signal for determining the setting of said selector switch means and signal controlled means operated by said function control means for applying said instruction word address selection digit signals of said instruction word signal to said second address selecting means in response to a particular function digit configuration of an instruction word signal.

2. An electronic digital computing machine comprising a first plurality of sources of or destinations for data signals selectable under the control of a machine instruction signal in which at least one of said sources or destinations is a busbar associated with a further plurality of sources or destinations, the connection of any chosen one of said further plurality of sources or destinations to said busbar being effected under the control of a special machine instruction signal, said connection of said chosen one of said further sources or destinations to said busbar being retained continuously after the incidence of said special machine instruction signal until the arrival of a further special machine instruction signal for connecting a different one of said further sources or destinations to said busbar.

3. An electronic digital computing machine according to claim 1 in which said second address selecting means includes a staticisor device comprising a plurality of separate sections adapted to be set in accordance with the digit configuration of a predetermined selection of digit signals of said machine instruction word signal and in which said signal controlled means includes at least one gate circuit controlled by said function group of digit signals in said machine instruction word signal for normally inhibiting the operation of such staticisor except upon the occurrence of said particular function digit configuration of said instruction signal.

4. An electronic digital computing machine according to claim 3 wherein the outputs from said staticisor control a number of further gate circuits which in turn control the energisation of an associated electromagnetic relay, each of said relays controlling the connection of one of said transducer heads to said busbar.

5. An electronic digital computing machine having a computing unit, a first plurality of sources of or destinations for data signals, signal-controlled address selection means operable by a machine instruction word signal for connecting any chosen one of said sources or destinations to said computing unit, at least one of said sources or destinations being a busbar, a plurality of further sources of or destinations for data signals, selector switch means for setting up a sustained connection between a chosen one of said further plurality of sources or destinations and said busbar whereby such chosen further source or destination is automatically connected to said computing circuit upon selection of said busbar one of said first plurality of sources or destinations by said address selection means and means for altering the setting of said selector switch means by means of a machine instruction word signal.

6. An electronic digital computing machine having a computing unit, a first plurality of sources of or destinations for data signals, signal-controlled address selection means operable by a machine instruction word signal for connecting any chosen one of said sources or destinations to said computing unit, at least one of said sources or destinations being a busbar, a plurality of further sources of or destinations for data signals, selector switch means for setting up a sustained connection between a chosen one of said further plurality of sources or destinations and said busbar whereby such chosen further source or destination is automatically connected to said computing unit upon selection of said busbar one of said first plurality of sources or destinations by said address selection means, signal-controlled means for altering the selection setting of said selector switch means and signal sensing means for detecting a particular form of machine instruction word signal and for deriving therefrom a control signal for said altering means.

7. An electronic digital computing machine according to claim 6 comprising a data store of the magnetic wheel type providing a number of discrete recording tracks each having an associated transducer head and wherein said first plurality of sources or destinations consist of a first group of such heads and wherein said further plurality of sources or destinations consist of a further group of such heads other than those included in the first group.

8. An electronic digital computing machine comprising a data signal transfer channel, a first plurality of sources of data signals, at least one of said sources being a busbar, a control system for receiving an instruction word signal comprising an address digit section and a function digit section and for controlling the operation of said machine in accordance with the digit configuration of said signal, said control system including address selecting means controlled by said address digit section of said instruction word signal for making selective connection between any one of said first plurality of sources and said data signal transfer channel and function control means controlled by said function digit section of said instruction word signal for determining the type of operation to be performed by the machine, a second plurality of sources of data signals, selector switch means for maintaining a continuous connection between any chosen single one of said further plurality of sources and said busbar and means for altering the setting of said selector switch means, said altering means being operated by said function control means in response to an instruction word signal having a particular function digit configuration.

9. An electronic digital computing machine according to claim 6 wherein the normal instruction word signal of said machine comprises an address digit signal group having a first sub-group for defining a particular discrete address location in any one source and a second sub-group for defining a particular source out of said first plurality of sources characterised in that said signal sensing means detect the form of at least a part of said first sub-group and derive therefrom a control signal for said altering means defining the chosen one of said further plurality of sources or destinations which is to be connected to said busbar.

10. An electronic digital computing machine comprising a magnetic wheel type data store having a signal transfer channel, a first plurality of magnetic transducer heads, a second plurality of magnetic transducer heads, a head extension busbar, first signal-operated selector switching means for connecting any chosen one of said second plurality of transducer heads to said head extension busbar and second signal-operated selector switching means for connecting any one of said first plurality of transducer heads or said head extension busbar to said signal transfer channel, a control system for controlling the operation of the machine in accordance with an applied instruction signal, said instruction signal comprising an address-defining digit section and a function-defining digit section, said control system including first address signal staticisor means operable by at least a part of said address digit section of said applied instruction signal and providing output signals for operating said second selector switching means, second address signal staticisor means also operable by at least a part of said address digit section of said applied instruction signal and providing output signals for operating said first selector switching means, function digit staticisor means operable by said function digit section of said applied instruction signal and providing variable control signals dependent upon the functional requirements of the said applied instruction signal and operation inhibiting means operable by said control signals from said function digit staticisor means for preventing operation of said second address signal staticisor means by said address digit section of any applied instruction signal except one of a first type whose functional requirement is an operation of said first selector switching means whereby the application of such a first type instruction signal to said control system causes said address digit section thereof to operate said second staticisor means to operate said first switching means to connect a chosen one of said second plurality of transducer heads to said head extension busbar and whereby the subsequent application to said control system of an instruction signal of a type other than said first type and with an address digit section defining said head extension busbar causes operation of said first staticisor means to operate said second switching means to connect said chosen one of said second plurality of transducer heads to said signal transfer channel.

11. An electronic digital computing machine comprising a data store having a signal input channel, a plurality of separate storage locations, said storage locations comprising a first group and a second group, an extension busbar, first signal-operated pre-settable selector switching means for providing a sustained connection between any chosen one of said second group of storage locations and said extension busbar, and second signal-operated selector switching means for connecting any one of said first group of storage locations or said extension busbar to said signal input channel, a control system for controlling operation of the machine in accordance with an applied instruction signal, said instruction signal comprising an address-defining digit section and a function-defining digit section, said control system including first address signal sensing means operable by at least a part of said address digit section of said applied instruction signal and providing output signals for operating said second selector switching means, second address signal sensing means also operable by at least a part of said applied instruction signal and providing output signals for operating said first selector switching means, function digit sensing means operable by said function digit section of said applied instruction signal and providing variable control signals dependent upon the functional requirements of said applied instruction signal and operation inhibiting means operable by said control signals from said function digit sensing means for preventing operation of said second address signal sensing means by any applied instruction signal except one of a type whose function digit section indicates a requirement to operate said first selector switching means.

12. An electronic digital computing machine according to claim 9 comprising a data store of the magnetic wheel type providing a number of discrete recording tracks each having an associated transducer head and wherein said first plurality of sources or destinations consist of a first group of such heads and wherein said further plurality of sources or destinations consist of a further group of such heads other than those included in the first group.

References Cited in the file of this patent

UNITED STATES PATENTS

| | | |
|---|---|---|
| 2,686,632 | Wilkinson | Aug. 17, 1954 |
| 2,789,759 | Tootill et al. | Apr. 23, 1957 |

FOREIGN PATENTS

| | | |
|---|---|---|
| 503,357 | Belgium | June 15, 1951 |
| 507,259 | Belgium | Dec. 15, 1951 |
| 732,221 | Great Britain | June 25, 1955 |

OTHER REFERENCES

"Description of a Magnetic Drum Calculator," Annals of the Computation Laboratory of Harvard University, vol. XXV, August 22, 1952, pp. 75 and 76.